United States Patent

Park

[11] Patent Number: 5,816,097
[45] Date of Patent: Oct. 6, 1998

[54] POSITION CONTROL APPARATUS FOR GYROSCOPE

[75] Inventor: Jong-Chul Park, Gumi, Rep. of Korea

[73] Assignee: Samsung Electronics Co., Ltd., Suwon, Rep. of Korea

[21] Appl. No.: 781,981

[22] Filed: Dec. 27, 1996

[30] Foreign Application Priority Data

Dec. 27, 1995 [KR] Rep. of Korea ................ 59446/1995

[51] Int. Cl.⁶ .................. G01C 19/02; G05G 11/00; F16M 13/00
[52] U.S. Cl. .................. 74/5 R; 74/5 F; 74/490.13; 248/514; 248/662; 248/664
[58] Field of Search .................. 74/5 R, 5 F, 490.13; 248/514, 662, 664

[56] References Cited

U.S. PATENT DOCUMENTS

| | | | |
|---|---|---|---|
| 2,424,222 | 7/1947 | Brown et al. | 248/278 |
| 2,660,833 | 12/1953 | Weber, Jr. | 248/514 X |
| 2,870,985 | 1/1959 | Martin et al. | 248/324 |
| 3,596,863 | 8/1971 | Kaspareck | 248/278 |
| 3,876,174 | 4/1975 | Culver | 248/279 |
| 5,419,521 | 5/1995 | Matthews | 248/278 |

Primary Examiner—Allan D. Herrmann
Attorney, Agent, or Firm—Robert E. Bushnell, Esq.

[57] ABSTRACT

A position control apparatus for a gyroscope mechanically controls a setting position of the gyroscope. The position control apparatus for a gyroscope includes a circular mount for adjusting a setting position of the gyroscope in a predetermined direction, a plurality of tightening screws for fixing the gyroscope to the circular mount by way of several through holes, a plurality of locking screws for fixing the circular mount by way of several open holes formed in a supporting mechanism, a plurality of adjusting screws for adjusting the set position of the gyroscope in a up or down direction, and an adjusting flute prepared at an end of the circular mount, for adjusting the set position of the gyroscope in an axial direction.

16 Claims, 4 Drawing Sheets

POSITION CONTROL APPARATUS FOR GYROSCOPE

CLAIM OF PRIORITY

This application makes reference to, incorporates the same herein, and claims all benefits accruing under 35 U.S.C. §119 from an application entitled Position Control Apparatus for Gyroscope earlier filed in the Korean Industrial Property Office on the 27$^{th}$ day of Dec. 1995, and there duly assigned Ser. No. 59446/1995 by that Office.

BACKGROUND OF THE INVENTION

1. Field of the Invention

The present invention relates generally to gyroscopes, and more particularly to a position control apparatus for a gyroscope, in which a mounting position of the gyroscope is mechanically controlled by employing a mounting board.

2. Description of the Related Art

In contemporary designs for mounting a gyroscope, a plurality of screws directly attach the housing of the gyroscope to a mechanism via a plurality of first and second through holes. The gyroscope is connected to an electronic circuit for controlling the setting position of the gyroscope. Once the housing of the gyroscope is firmly attached to the base, the screws are tightened until the gyroscope is unmovable relative to the base. Consequently, whenever the condition of the system changes, the position signal detected by the electronic circuit from the gyroscope must be compensated in order to enable a control program to control the whole system.

Once the gyroscope is securely bolted to the base, the position of the gyroscope is mechanically unadjustable. Therefore, in order to identify a detected position signal with the reference position preset in the control program, the position signal to be applied to the control program must be corrected in advance in order to be identified with the reference position. Moreover, it is difficult to secure the identity of the control programs, when mass producing the devices. Furthermore the systems may be mistakenly assembled during the manufacturing process. Since the electronic circuit is a necessary component part to control the position control signal of the gyroscope, the production cost is undesirably increased.

SUMMARY OF THE INVENTION

It is therefore an object of the present invention to provide a position control apparatus for a gyroscope, capable of mechanically controlling a mounting position of the gyroscope.

It is another object of the present invention to provide a position control apparatus for a gyroscope capable of securing an identity of the control programs.

It is still another object of the present invention to provide a position control apparatus for a gyroscope capable of simplifying a manufacturing process thereof.

It is yet another object of the present invention to provide a position control apparatus for a gyroscope capable of reducing the producing cost.

According to an aspect of the present invention, a position control apparatus for a gyroscope may be constructed with a circular mount accommodating minute manual adjustment to the assembled position of the gyroscope relative to a selected azimuthal direction. A plurality of screws attach the gyroscope to the circular mount by way of a plurality of through holes, while a second plurality of screws secure the circular mount to a supporting mechanism by way of a plurality of through holes prepared in the mechanism. A third plurality of screws enable adjustment of the set position of the gyroscope in a vertical direction, while a first adjusting flute prepared at an end of the circular mount, enable adjustment of the set position of the gyroscope in an axial direction.

BRIEF DESCRIPTION OF THE DRAWING

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
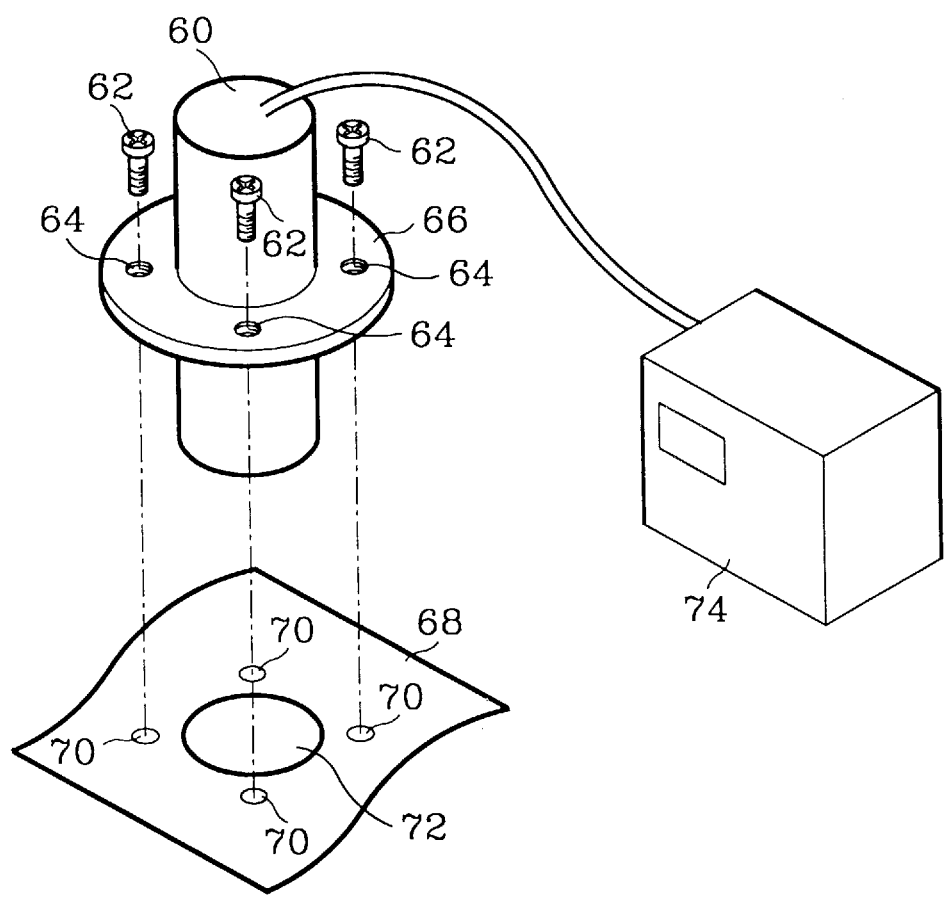
FIG. 1 is a perspective view of a position control apparatus for a gyroscope according to the contemporary practice.

Referring to FIG. 1, there is shown the prior art position control apparatus for a gyroscope. In the drawing, a circular plate 66 is mounted on the middle of a gyroscope 60. A plurality of tightening screws 62 fix the circular plate 66 to a base 68 by way of a plurality of first and second through holes 64, 70 prepared respectively in the circular plate 66 and the base 68. Further, the base 68 has, at the center thereof, an opening 72 through which a cylindrical member of the gyroscope 60 is inserted. The gyroscope 60 is connected to an electronic part 74 for controlling the mounting position of the gyroscope.

In operation, the gyroscope 60 is inserted into the opening 72 prepared in the base 68, After the insertion, the first through holes 64 perforating circular plate 66 of the gyroscope 60 is adjusted to be aligned with the second through holes 70 prepared in the base 68. Thereafter, the tightening screws 62 pass through the first and second through holes 64 and 70 to fix the gyroscope 60 to the base 68. Once the gyroscope 60 is firmly attached to the base 68 by the tightening screws 62, the gyroscope 60 is unmovable with respect to the base 68. Therefore, whenever the system condition is changed, the position signal detected by the electronic part 74 from the gyroscope 60 should be properly corrected to be suitable for a control program for controlling the whole system. Then, the whole system is controlled by the control program of the electronic part 74, in accordance with the detected position signal output from the gyroscope 60.

In the prior art device, once the gyroscope 60 is fixed to the base 68 with the tightening screws 62, the position of the gyroscope 60 is mechanically unadjustable. Therefore, in order to identify the detected position signal with the reference position preset in the control program, the position signal to be applied to the control program should be previously corrected to be identified with the reference position. Therefore, it is difficult to secure the identity of the control programs, when mass producing the devices and, further the products may be mistakenly assembled during the manufacturing process. Moreover, since the electronic part 74 must be employed to control the position control signal of the gyroscope 60, the production cost may be undesirably increased.

Figure 2:
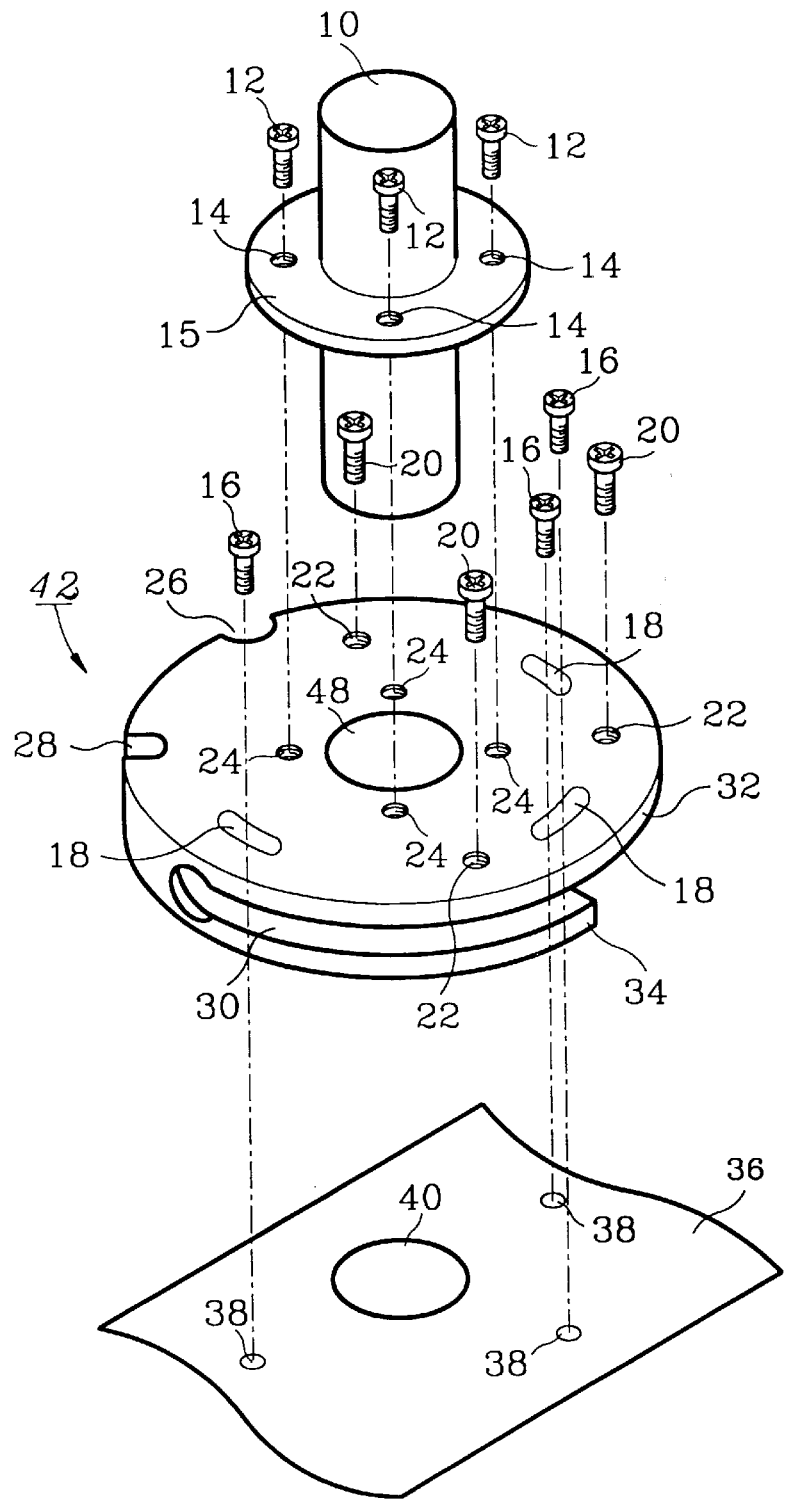
FIG. 2 is a perspective view of a disassembled construction of a position control apparatus for a gyroscope constructed as an embodiment according to the principles of the present invention.

Referring now to FIG. 2, there is shown a position control apparatus for a gyroscope according to an embodiment of the present invention. A circular flange 15 perforated with a plurality of first through holes 14, is mounted around the middle of the exterior housing of gyroscope 10. The gyroscope 10 is fixed to a circular mount 42 by a plurality of tightening screws 12. Circular mount 42 is mounted under circular flange 15 and is movable both in a vertical direction and in the axial direction. A second opening 48 is prepared at the center of the circular mount 42 into which the gyroscope 10 is inserted. A plurality of fourth through holes 24 are prepared between the second opening 48 and the other periphery of circular mount 42, so as to fix the gyroscope 10 to the circular mount 42 with the tightening screws 12. Further, an arcuate set of through holes 18 is prepared between the fourth through holes 24 and the outer periphery of circular mount 42, to fix the circular mount 42 to a base 36 with a plurality of locking screws 16 (in the embodiment, three locking screws are used). Here, the second through holes 18 are of arcuate through holes shaped as arcuate grooves that may be coaxially centered with the center of first circular opening 40 so that when the circular mount 42 is fixed to the base 36, an upper member 32 of the circular mount 42 may become freely movable up and down.

Further, a plurality of third through holes 22 into which a plurality of adjusting screws 20 are inserted are located between of the fourth through holes 24 and the outer periphery of circular mount 42, so that the gyroscope 10 is movable in an azimuthal direction. It should be noted that three adjusting screws are used for finely adjusting the setting position of the gyroscope 10. A first adjusting flute 28 is cut at an end of the circular mount 42, to adjust the setting position of the gyroscope 10 towards the axial direction, A handle grip 26 is formed at an end of the circular mount 42, to roughly adjust the mounting position of the gyroscope 10.

Moreover, a C-shaped pry slot 30 is formed between the upper and lower members 32, 34 of the circular mount 42, so as to allow the upper member 32 to enable fine, minute movement in the vertical direction by driving the adjusting screws 20.

A first opening 40 into which the gyroscope 10 is inserted is formed at the center of the base 36. A plurality of fifth through holes 38 into which the locking screws 16 are inserted to fix the circular mount 42 to the base 36 are located on base 36 away from first opening 40.

Operation of the present invention will now be described in detail hereinbelow with reference to FIGS. 2 through 6.

As shown in the drawings, the cylindrical member of the gyroscope 10 is inserted into the second opening 48 prepared at the center of the circular mount 42. At this moment, the first through holes 14 prepared in the circular flange 15 of the gyroscope 10 should be adjusted to be aligned with the fourth through holes 24 formed in the circular mount 42. Then, passing through the first and fourth through holes 14 and 24, the tightening screws 12 fix the gyroscope 10 to the circular mount 42. Since the circular mount 42 includes the C-shaped pry slot 30, the upper member 32 of the circular mount 42 is bendable downward by driving the adjusting screws 20 passing through the third through holes 22 prepared in the upper member 32 of the circular mount 42.

The adjusting screws 20 finely move the upper member 32 of the circular mount 42 in the vertical direction along the third through holes 22 by using the pitches of the adjusting screws 20. Here, since the gyroscope 10 is fixed to the circular mount 42 through the tightening screws 12, the set position of the gyroscope 10 is finely adjustable in the azimuthal direction.

Figure 3:
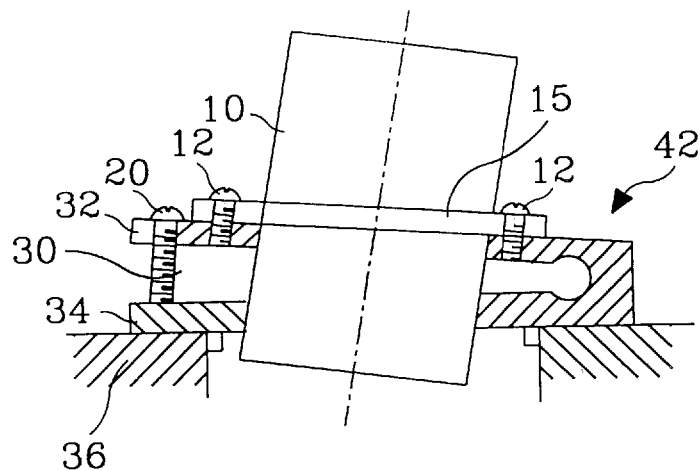
FIG. 3 is a cross-sectional view of the position control apparatus showing that the gyroscope when slanted to the right hand direction by use of the adjusting screws according to the principles of the present invention.

Referring to FIG. 3, it is shown that the gyroscope 10 is slanted in the right hand direction by moving the adjusting screws 20 upwardly. At this moment, the upper member 32 of the circular mount 42 is lifted up by using the adjusting screws 20.

Figure 4:
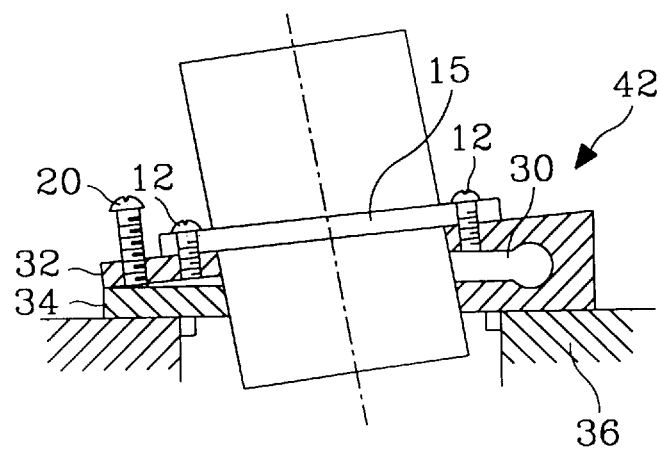
FIG. 4 is a cross-sectional view of the position control apparatus showing that the gyroscope when slanted to the left hand direction by use of the adjusting screws according to the principles of the present invention.

Referring to FIG. 4, it is shown that the gyroscope 10 is slanted in the left hand direction by moving the adjusting screws 20 downward. Here, the upper member 32 of the circular mount 42 is bent down by using the adjusting screws 20. Then, the cylindrical member of the gyroscope 10 with the circular mount 42 mounted thereon is inserted into the first opening 40 formed in the center of the base 36.

In the meantime, the gyroscope 10 is adjustable in the axial direction thereof by inserting and turning a flat-blade screwdriver 44 between the first adjusting flute 28 prepared at an end of the circular mount 42 and a second adjusting flute 46 prepared at a outer circumference of the first opening 40 prepared in the base 36.

Figure 5:
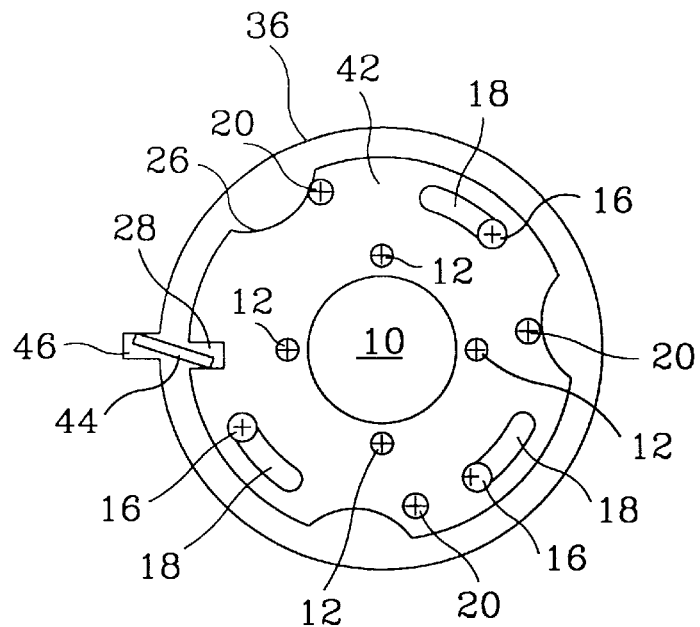
FIG. 5 is a plane view of the position control apparatus for a gyroscope showing a circular mount when rotated counterclockwise relative to its supporting mechanism, in accordance with the principles of the present invention.
Figure 6:
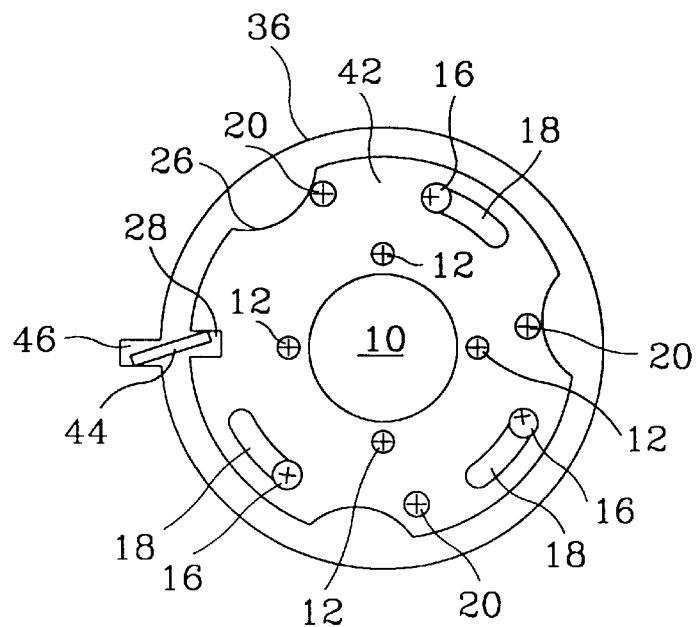
FIG. 6 is a plane view of the position control apparatus for a gyroscope showing a circular mount when rotated clockwise relative to its supporting mechanism, according with the principles of the present invention.

FIGS. 5 and 6 show how the circular mount 42 is movably rotatable counterclockwise and clockwise, respectively. Upon completion of adjustment of the position of the gyroscope 10 in the azimuthal and axial directions, the second through holes 18 of the circular mount 42 are aligned with the fifth through holes 38 of the base 36 and then, the locking screws 16 are firmly screwed up to fix the circular mount 42 to the base 36. Alternatively, in case where the gyroscope 10 should be roughly adjusted, the handle grip 26 formed at the circular mount 42 may be used to movably rotate the gyroscope 10 in the axial direction.

As described heretofore, the position control apparatus for a gyroscope according to the present invention mechanically controls the setting position of the gyroscope by utilizing a circular mount, so that the control programs for different gyroscope systems may be easily identified with each other. Further, since the setting position of the gyroscope is freely adjustable by using the adjusting screws, the manufacturing process may be simplified. In addition, since the setting position of the gyroscope is adjustable in the mechanical manner (not in the electrical manner like the prior art), the producing cost may be reduced.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A position control apparatus for a gyroscope comprising:
   a circular mount for adjusting a setting position of the gyroscope in a predetermined direction, said circular mount being perforated by a first set of through holes;
   a plurality of tightening screws for fixing said gyroscope to said circular mount by way of said first set of through holes;
   a base onto which said circular mounting board is affixed, said base perforated by a second set of through holes;
   a plurality of locking screws for fixing said circular mount by way of said second set of through holes prepared in said base;
   a plurality of adjusting screws for adjusting the setting position of said gyroscope in an azimuthal direction; and
   a first adjusting flute prepared at an end of said circular mount, for adjusting the setting position of said gyroscope in an axial direction.

2. The position control apparatus for a gyroscope according to claim 1, wherein said circular mount is adjustable in the vertical and axial directions.

3. The position control apparatus for a gyroscope according to claim 1, wherein said circular mount comprises a third set of through holes, formed at an upper member thereof, into which said locking screws are inserted.

4. The position control apparatus for a gyroscope according to claim 3, wherein said third set of through holes are of longitudinal holes for freely adjusting a vertical position of said upper member of the circular mount which is fixed to said base.

5. The position control apparatus for a gyroscope according to claim 1, wherein said circular mount comprises at an end thereof a handle grip, so as to roughly adjust the setting position of said gyroscope in the axial direction.

6. The position control apparatus for a gyroscope according to claim 1, further comprising a second adjusting flute, so as to adjust the setting position of the gyroscope in the axial direction in association with said first adjusting flute.

7. The position control apparatus for a gyroscope according to claim 1, wherein said circular mount comprises a slot prepared between an upper member and a lower member thereof, so as to finely adjust the setting position of the gyroscope in the up/down direction by driving said adjusting screws to bend said upper member up and down.

8. The position control apparatus for a gyroscope according to claim 7, wherein said slot is of a C-shaped longitudinal slot.

9. The position control apparatus for a gyroscope according to claim 1, wherein three said locking screws are provided to firmly fixing said circular mount to said mechanism.

10. The position control apparatus for a gyroscope according to claim 1, wherein three said adjusting screws are provided to finely adjust the setting position of said gyroscope.

11. A position control apparatus for a gyroscope, comprising:
    a circular mounting board for adjusting a mounting position of the gyroscope in a predetermined direction, said circular mounting board having an upper member and a lower member separated from said upper member;
    a base onto which said lower member of said circular mounting board is affixed;
    a first set of through holes perforating a circular plate that forms an annular ring about said gyroscope;
    a set of arcuate through holes perforating said circular mounting board, said arcuate through holes for adjusting the axial angle of said gyroscope relative to said base;
    a third set of through holes perforating said upper member of said circular mounting board, said third set of through holes for adjusting the azimuthal angle of said gyroscope relative to said base;
    a fourth set of through holes perforating said upper member of said circular mounting board, said fourth set of through holes coincident with said first set of through holes perforating said circular plate about said gyroscope and used for attaching said gyroscope to said circular mounting board; and
    a fifth set of through holes, said fifth set perforating said base and aligned and coincident to said set of arcuate through holes perforating said circular mounting board.

12. A position control apparatus of claim 11, further comprising a first set of screws threaded into said third set of through holes, adjusting the distance separating said upper member from said lower member along one side of said circular mounting board, thereby adjusting said azimuthal angle of said gyroscope.

13. The position control apparatus of claim 11, further comprising:
    a second set of screws inserted through said arcuate through holes in said circular mounting board and threaded into said fifth set of through holes perforating said base;
    a first flute formed on the periphery of said circular mounting board; and
    a second flute formed on said base and adjacent to and aligned with said first flute when said circular mounting board is attached to said base, said second flute and said first flute forming a pry point for rotating said circular mounting board in an axial direction with respect to said base, causing said arcuate apertures in said circular mounting board to slide about said second set of screws.

14. A position control apparatus for an instrument, comprising:
    a circular mounting board for adjusting a mounting position of the instrument in a predetermined direction, said circular mounting board having an upper member and a lower member separated from said upper member;
    a base onto which said lower member of said circular mounting board is affixed;
    a first set of through holes perforating a circular plate that forms an annular ring about said instrument;
    a set of arcuate through holes perforating said circular mounting board, said arcuate through holes for adjusting the axial angle of said instrument relative to said base;
    a third set of through holes perforating said upper member of said circular mounting board, said third set of through holes for adjusting the azimuthal angle of said instrument relative to said base;
    a fourth set of through holes perforating said upper member of said circular mounting board, said fourth set of through holes coincident with said first set of through holes perforating said circular plate about said instrument and used for attaching said instrument to said circular mounting board; and
    a fifth set of through holes, said fifth set perforating said base and aligned and coincident to said set of arcuate through holes perforating said circular mounting board.

15. A position control apparatus of claim 14, further comprising a first set of screws threaded into said third set of through holes, adjusting the distance separating said upper member from said lower member along one side of said circular mounting board, thereby adjusting said azimuthal angle of said instrument.

16. The position control apparatus of claim 14, further comprising:

a second set of screws inserted through said arcuate through holes in said circular mounting board and threaded into said fifth set of through holes perforating said base;

a first flute formed on the periphery of said circular mounting board; and a second flute formed on said base and adjacent to and aligned with said first flute when said circular mounting board is attached to said base, said second flute and said first flute forming a pry point for rotating said circular mounting board in an axial direction with respect to said base, causing said arcuate apertures in said circular mounting board to slide about said second set of screws.

* * * * *